US012271135B2

(12) United States Patent
Ikeda

(10) Patent No.: US 12,271,135 B2
(45) Date of Patent: Apr. 8, 2025

(54) DRIVING DEVICE AND IMAGE FORMING APPARATUS

(71) Applicant: CANON KABUSHIKI KAISHA, Tokyo (JP)

(72) Inventor: Shinya Ikeda, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/502,726

(22) Filed: Nov. 6, 2023

(65) Prior Publication Data

US 2024/0152082 A1 May 9, 2024

(30) Foreign Application Priority Data

Nov. 7, 2022 (JP) ................................ 2022-178107

(51) Int. Cl.
*G03G 15/00* (2006.01)

(52) U.S. Cl.
CPC ....... *G03G 15/5008* (2013.01); *G03G 15/757* (2013.01)

(58) Field of Classification Search
CPC ......................... G03G 15/757; G03G 15/5008
See application file for complete search history.

(56) References Cited

U.S. PATENT DOCUMENTS

| | | | | |
|---|---|---|---|---|
| 9,346,449 | B1 * | 5/2016 | Chang | B60T 17/221 |
| 2014/0195117 | A1 * | 7/2014 | Kuwahara | G01L 3/105 73/862.331 |
| 2016/0216332 | A1 * | 7/2016 | Gajanayake | G01R 31/42 |

FOREIGN PATENT DOCUMENTS

| | | | | | |
|---|---|---|---|---|---|
| JP | H07231687 | A | * | 8/1995 | |
| JP | 2007309980 | A | | 11/2007 | |
| JP | 4244412 | B2 | * | 3/2009 | B60J 7/0573 |
| JP | 2011226847 | A | * | 11/2011 | |
| JP | 2014176273 | A | | 9/2014 | |
| JP | 2019139375 | A | * | 8/2019 | |

OTHER PUBLICATIONS

Machine translation of Aoki (2009).*
Machine translation of Ariyoshi (2019).*
Machine translation of Kawanishi (2011).*
Machine translation of Matsamura (1995).*

* cited by examiner

*Primary Examiner* — Sevan A Aydin
(74) *Attorney, Agent, or Firm* — Canon U.S.A., Inc. IP Division

(57) ABSTRACT

A driving device includes a drive source including a plurality of windings, a plurality of driving components configured to transmit a driving force output from the drive source to a load, a current detector configured to detect a driving current flowing through the plurality of windings, and at least one processor configured to determine a lifespan and presence or absence of abnormality of the drive source and the plurality of driving components based on the driving current, wherein the current detector is configured to detect a first driving current flowing through a first winding with a first low-pass filter having a first cutoff frequency, and detect a second driving current flowing through a second winding with a second low-pass filter having a second cutoff frequency which is higher than the first cutoff frequency.

11 Claims, 8 Drawing Sheets

DRIVING DEVICE AND IMAGE FORMING APPARATUS

BACKGROUND OF THE DISCLOSURE

Field of the Disclosure

The present disclosure relates to a driving device including a stepping motor and a drive mechanism to be driven by the stepping motor, and to an image forming apparatus including such a driving device.

Description of the Related Art

In order to print an image on a sheet, image forming apparatus such as printers, copying machines, and multifunction peripherals include, for example, a conveyance roller that conveys a sheet, a photosensitive drum on which an image is to be formed, and a transfer roller for transferring the image formed on the photosensitive drum onto the sheet. The transfer roller forms a nip portion with an image bearing member that bears the image at the time of transfer of the image, and transfers the image from the image bearing member onto the sheet at the nip portion. In order to form the nip portion, the transfer roller can perform contact/separation operation with respect to the image bearing member. For example, the transfer roller waits at a position apart from the image bearing member at the time other than the time of transfer, thereby preventing degradation of the image bearing member.

A stepping motor is often used as a drive source of the driving device that performs, for example, rotational driving of the conveyance roller, rotational driving of the photosensitive drum, and contact/separation driving of the transfer roller. Replacement of components forming the driving device, such as driving components and the stepping motor, is performed in view of the following points.

(1) Component lifespan due to use of a component over a predetermined number of passage of sheets or a predetermined accumulative time of driving (2) Detection of abnormality, for example, malfunction of a component In the replacement of a component due to the component lifespan, a component is replaced before the component reaches an estimated lifespan and thus cannot normally operate any longer. The component lifespan is set in consideration of, for example, an installation environment of an image forming apparatus, a type of sheet used for printing, and variation in property of components. Typically, some margin is included in the component lifespan. Thus, even when a component is replaced based on the set component lifespan, it is rare that the component actually has already reached the lifespan. However, in order to reduce running costs of an image forming apparatus, it is preferred that a frequency of replacement of a component be low. In Japanese Patent Application Laid-open No. 2007-309980, there is disclosed an image forming apparatus in which a driving current of a motor that drives a driving component is measured, and a component lifespan is predicted from the measured driving current so that replacement of a component is performed at an appropriate timing, thereby reducing the running costs.

In the replacement of a component due to the detection of abnormality, a component is replaced in a case where the component cannot normally operate any longer due to an unexpected event. Abnormality of a component is detected by monitoring operation of the component with use of an abnormality detection sensor such as an optical sensor, for example, a photo-interrupter. In this case, it is difficult to distinguish whether the detected abnormal state corresponds to abnormality of the abnormality detection sensor itself, abnormality of the component, or abnormality of a control board that controls the abnormality detection sensor and the component. Thus, it takes time to specify an abnormal part at the time of detection of abnormality, resulting in long downtime of the image forming apparatus. Further, there is also a possibility that running costs may increase due to unnecessary replacement of a component. In Japanese Patent Application Laid-open No. 2014-176273, there is disclosed a device that performs abnormality detection in which a detection method for a driving current of a motor that drives a drive mechanism is changed in accordance with driving conditions. This device can detect abnormality of, for example, a component without use of, for example, a sensor.

In order to suppress an increase in running costs due to unnecessary replacement of a component and reduce downtime of a device at the time of occurrence of abnormality, it is required to accurately predict a component lifespan and specify an abnormal part of a component. In a case where both the configuration of Japanese Patent Application Laid-open No. 2007-309980 and the configuration of Japanese Patent Application Laid-open No. 2014-176273 are adopted, a circuit scale becomes larger, with the result that an initial cost increases. Further, with the configuration of Japanese Patent Application Laid-open No. 2014-176273, it is difficult to specify abnormality such as disconnection of a winding of a motor itself.

SUMMARY OF THE DISCLOSURE

A driving device according to one embodiment of the present disclosure includes a drive source including a plurality of windings, a plurality of driving components configured to transmit a driving force output from the drive source to a load, a current detector configured to detect a driving current flowing through the plurality of windings, and at least one processor configured to determine a lifespan and presence or absence of abnormality of the drive source and the plurality of driving components based on the driving current, wherein the current detector is configured to detect a first driving current flowing through a first winding with a first low-pass filter having a first cutoff frequency, and detect a second driving current flowing through a second winding with a second low-pass filter having a second cutoff frequency which is higher than the first cutoff frequency, wherein the at least one processor is configured to determine the lifespan of the drive source based on the first driving current, and wherein the at least one processor is configured to determine the presence or absence of abnormality of the drive source based on the first driving current and the second driving current, and determine the presence or absence of abnormality of the plurality of driving components based on the second driving current.

An image forming apparatus according to another embodiment of the present disclosure includes an image forming unit configured to form an image on a sheet, a load to be used for forming the image, and a driver configured to drive the load, the driver includes a drive source including a plurality of windings, a plurality of driving components configured to transmit a driving force output from the drive source to the load, a current detector configured to detect a driving current flowing through the plurality of windings, and at least one processor configured to determine a lifespan and presence or absence of abnormality of the drive source and the plurality of driving components based on the driving current, the current detector is configured to detect a first driving current flowing through a first winding with a first low-pass filter having a first cutoff frequency, and detect a second driving current flowing through a second winding with a second low-pass filter having a second cutoff frequency which is higher than the first cutoff frequency, the at least one processor is configured to determine the lifespan of the drive source based on the first driving current, the at least one processor is configured to determine the presence or absence of abnormality of the drive source based on the first driving current and the second driving current, and determine the presence or absence of abnormality of the plurality of driving components based on the second driving current.

Further features of the present disclosure will become apparent from the following description of exemplary embodiments (with reference to the attached drawings).

DESCRIPTION OF THE EMBODIMENTS

Now, an embodiment of the present disclosure is described with reference to the drawings. A configuration and a circuit of an apparatus described in this embodiment are merely examples for describing proposed contents, and the present disclosure is not limited to the contents described herein.

Figure 1:
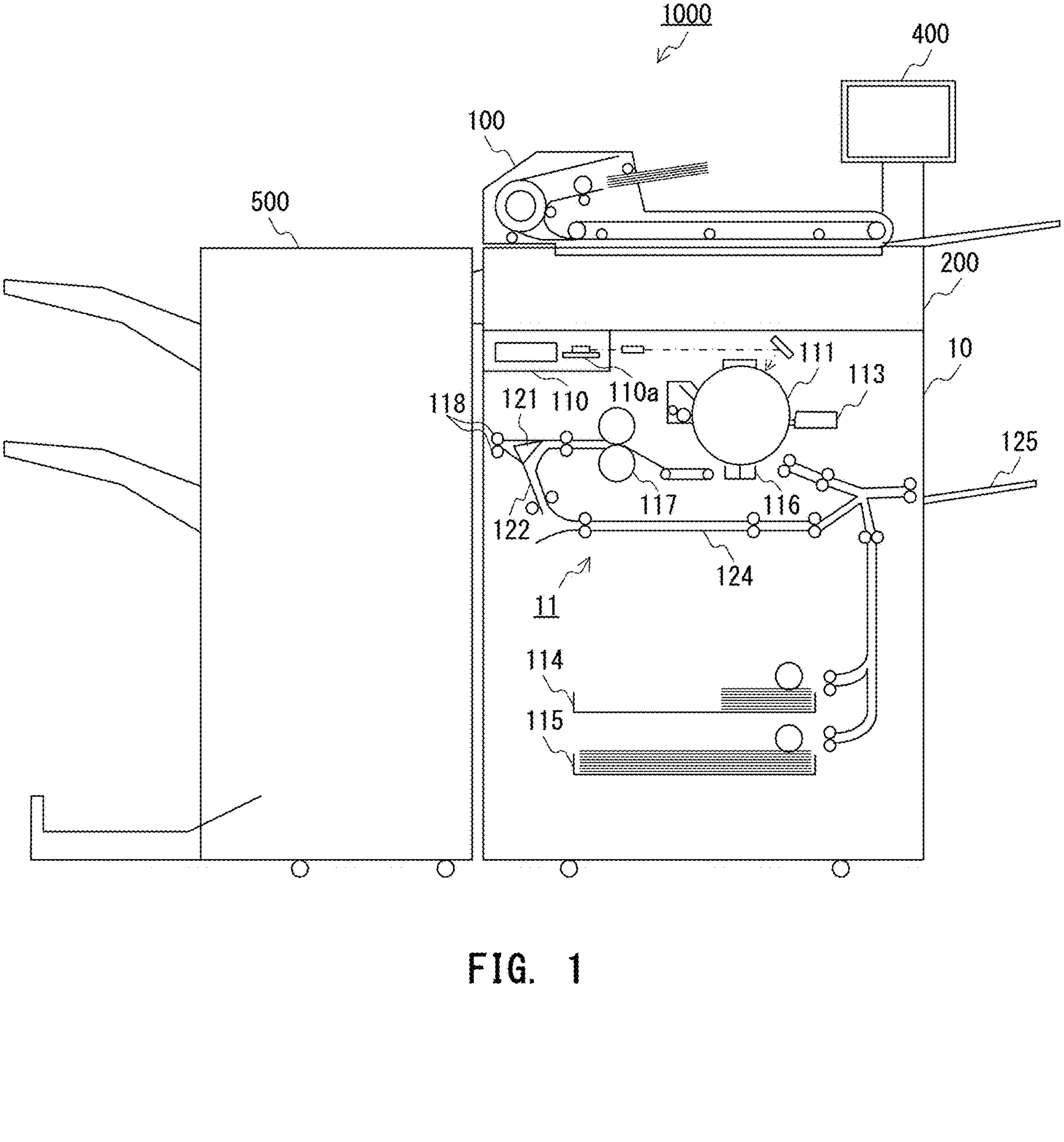
FIG. 1 is a configuration view of an image forming system.

FIG. 1 is a configuration view of an image forming system in this embodiment. An image forming system 1000 includes an image forming apparatus 10, a sheet processing device 500, a reader 200, an original feeding device 100, and an operation portion 400. The image forming apparatus 10 includes a driving device according to this embodiment. The image forming apparatus 10 according to this embodiment has a configuration for forming a monochrome image, but the driving device according to this embodiment may be adopted even when the image forming apparatus 10 has a configuration for forming a color image.

The reader 200 is an original reading device that reads an image from an original having the image formed thereon. The reader 200 generates a video signal based on the read image and transmits the video signal to the image forming apparatus 10. The reader 200 can read an image from an original placed on an original table (not shown), and can also read an image from an original fed by the original feeding device 100. The original feeding device 100 can successively convey a plurality of originals to a reading position at which the originals are read by the reader 200.

The operation portion 400 is a user interface including an input interface and an output interface. Examples of the input interface include various key buttons and a touch panel. Examples of the output interface include a display and a speaker. A user can input, for example, instructions and various settings via the input interface of the operation portion 400. A user can check, for example, a state of the image forming system 1000 and various notifications via the output interface of the operation portion 400. Examples of the notifications include a notification that urges a user to replace a component that requires replacement due to, for example, a lifespan or occurrence of abnormality.

The image forming apparatus 10 includes, as an image forming unit 11 for forming an image on a sheet, an exposure controller 110, a photosensitive drum 111, a developing device 113, a transfer portion 116, and a fixing device 117. The image forming apparatus 10 includes a manual feeding tray 125, sheet-feeding cassettes 114 and 115 to accommodate sheets on which images are to be formed. The sheets are fed one by one from any one of the sheet-feeding cassettes 114 and 115 or the manual feeding tray 125.

The exposure controller 110 modulates laser light based on the video signal acquired from an external device, for example, the reader 200, and outputs the modulated laser light. The exposure controller 110 includes a rotary polygon mirror 110*a*. The exposure controller 110 reflects the laser light with the rotary polygon mirror 110*a* and irradiates the photosensitive drum 111 with the laser light. The laser light scans the photosensitive drum 111 in one direction as a reflection angle of the laser light is changed by rotation of the rotary polygon mirror 110*a*.

The photosensitive drum 111 is a drum-shaped photosensitive member having a charged layer on a surface thereof. While being rotated about a drum shaft, the photosensitive drum 111 is scanned with the laser light under a state in which the surface is uniformly charged. As a result of scanning with the laser light, an electrostatic latent image corresponding to the video signal is formed on the surface of the photosensitive drum 111. The developing device 113 accommodates a developer, and uses the developer to develop the electrostatic latent image formed on the photosensitive drum 111. As a result of developing the electrostatic latent image, a developer image is formed on the surface of the photosensitive drum 111. The photosensitive drum 111 rotates to convey the developer image to the transfer portion 116.

In accordance with a timing at which the developer image is formed on the photosensitive drum 111, a sheet is fed from any one of the sheet-feeding cassettes 114 and 115 or the manual feeding tray 125 and conveyed to a nip portion formed between the photosensitive drum 111 and the transfer portion 116. The transfer portion 116 transfers the developer image borne on the photosensitive drum 111 to the conveyed sheet. The sheet having the developer image transferred thereonto is conveyed to the fixing device 117. The fixing device 117 heats to melt the developer image and also pressurizes the developer image to fix the developer image onto the sheet. In the manner described above, the image is printed on the sheet.

On a downstream side of the fixing device 117 in a conveyance direction of a sheet, there are provided delivery rollers 118, a flapper 121, and a reverse path 122. The reverse path 122 has a duplex-printing conveyance path 124 coupled thereto. The flapper 121 allows the sheet having the image printed thereon to be conveyed to any one of the delivery rollers 118 or the reverse path 122. In a case of simplex printing, or in a case in which images are printed on both sides by duplex printing, the sheet is conveyed by the delivery rollers 118 to the sheet processing device 500.

In a case of performing duplex printing, a sheet having an image printed on one surface (first surface) is conveyed to the duplex-printing conveyance path 124 via the reverse path 122. In a case where the sheet is conveyed to the duplex-printing conveyance path 124 via the reverse path 122, a print surface for an image is reversed. The sheet is conveyed to the transfer portion 116 via the duplex-printing conveyance path 124, and an image is printed on another surface (second surface) by processing similar to that performed on the first surface.

The sheet processing device 500 can perform various types of post-processing with respect to the sheet having the image printed thereon. Examples of the post-processing include bookbinding processing and staple processing. The sheet processing device 500 delivers the sheet having been subjected to the post-processing to the outside. The sheet processing device 500 can also deliver the sheet directly without performing post-processing on the sheet.

<Driving Device>

Figure 2:
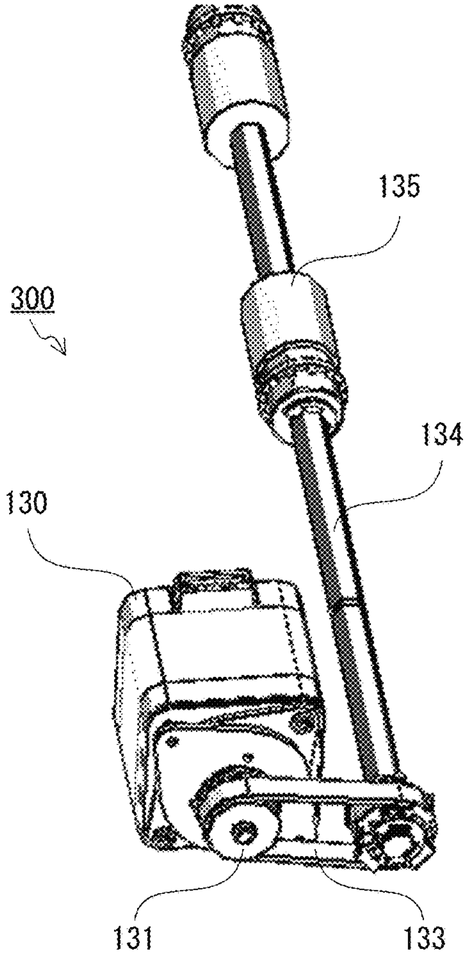
FIG. 2 is a configuration view of a driving device.

The image forming apparatus 10 includes a driving device for performing, for example, conveyance control for a sheet and rotation control for the photosensitive drum 111. The driving device includes a drive source and driving components. The driving components transmit a driving force output from the drive source to rotary members (loads) such as a conveyance roller that conveys a sheet and the photosensitive drum 111. Here, description is made of a driving device that drives the conveyance roller that conveys a sheet. FIG. 2 is a configuration view of such a driving device.

A driving device 300 according to this embodiment uses a stepping motor 130 as the drive source to rotationally drive a conveyance roller 135 being a rotary member (load). The conveyance roller 135 conveys a sheet. The stepping motor 130 is press-fitted into a pulley 131. The pulley 131 is connected to a conveyance roller shaft 134, which serves as a drive shaft for the conveyance roller 135, via a belt 133. The pulley 131, the belt 133, the conveyance roller shaft 134, and gears (not shown), for example, are the driving components.

As the stepping motor 130 rotates, the belt 133 connected to the pulley 131 rotates. The belt 133 rotates to transmit a driving force to the conveyance roller shaft 134, thereby rotating the conveyance roller shaft 134. The rotation of the conveyance roller shaft 134 causes the conveyance roller 135 to rotate so that the sheet is conveyed. A plurality of such conveyance rollers 135 are provided on a conveyance path extending from the sheet-feeding cassettes 114 and 115 and the manual feeding tray 125 to a part for delivering a sheet to the outside of the image forming apparatus 10.

To that end, a plurality of driving devices 300 are provided in the image forming apparatus 10. Alternatively, there may be given a configuration in which one driving device 300 performs drive control for a plurality of loads. For example, there is a case in which it may be better that two conveyance rollers arranged adjacent to each other on the conveyance path operate in synchronization with each other at the time of conveyance of a sheet. In such a case, one driving device 300 performs drive control for the two adjacent conveyance rollers. Further, in a case where a plurality of photosensitive drums are provided in the image forming apparatus 10 as in a case in which a color image is formed, rotations of two or more photosensitive drums may be subjected to drive control by one driving device 300.

Figure 3:
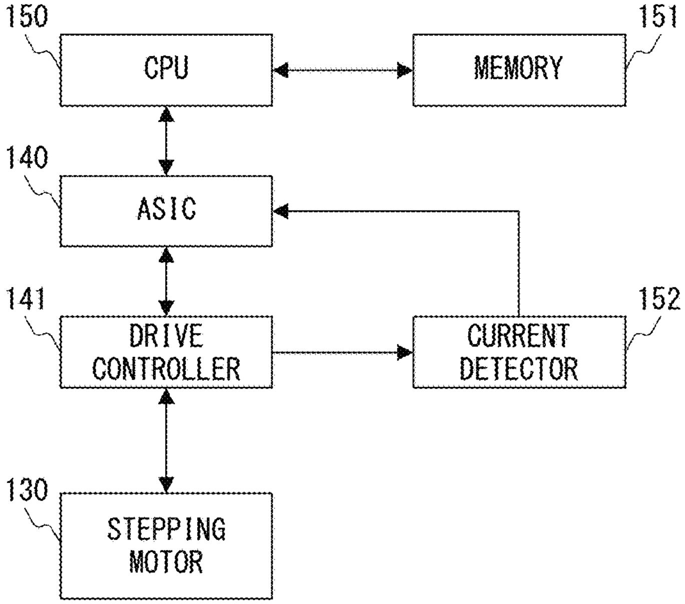
FIG. 3 is a configuration diagram of a control device.

FIG. 3 is a configuration diagram of a control device that performs drive control for the stepping motor 130. This control device is communicable with a main control device that controls operation of the entire image forming apparatus 10, and performs drive control for the stepping motor 130 in accordance with an instruction from the main control device. The control device may be provided in the driving device 300, or may be provided independently from the driving device 300.

The control device includes a central processing unit (CPU) 150, a memory 151, an application-specific integrated circuit (ASIC) 140, a drive controller 141, and a current detector 152. The CPU 150 executes a predetermined computer program to perform drive control for the stepping motor 130. The ASIC 140 is a semiconductor device dedicated to performing drive control for the stepping motor 130. The memory 151 stores a conversion formula or a conversion table for acquiring a current value (driving current value) of a driving current that flows through the stepping motor 130. In this embodiment, the ASIC 140 and the CPU 150 are separately described but may be configured as an integrated controller. That is, the control device may include, in place of the ASIC 140 and the CPU 150, a controller which is capable of executing both the processing of the ASIC 140 and the processing of the CPU 150.

The CPU 150 transmits driving conditions and a driving start command for the stepping motor 130 to the ASIC 140. Examples of the driving conditions include a drive speed (rotation speed) and a rotation direction of the stepping motor 130. The ASIC 140 generates a drive control signal for the stepping motor 130 based on the driving conditions and the driving start command acquired from the CPU 150. The ASIC 140 transmits the generated drive control signal to the drive controller 141. The drive controller 141 allows a driving current to flow through the stepping motor 130 based on the drive control signal. The stepping motor 130 drives with the driving current allowed to flow therethrough.

The current detector 152 detects the driving current flowing through the stepping motor 130, converts the driving current into a voltage, and subjects the converted voltage to, for example, amplification and smoothing to generate a detection signal. The current detector 152 transmits the generated detection signal to the ASIC 140. The ASIC 140 internally includes an A/D converter and a memory area (not shown). The ASIC 140 converts the detection signal acquired from the current detector 152 into a digital signal by the A/D converter and stores a conversion result in the memory area as current detection data.

The CPU 150 acquires the current detection data from the ASIC 140 at a predetermined timing, and converts the current detection data into a driving current value with use of the conversion formula or the conversion table stored in the memory 151. The CPU 150 uses the driving current value to perform, for example, calculation of a lifespan and detection of an abnormal state for the stepping motor 130 and the driving components, as described later.

Figure 4:
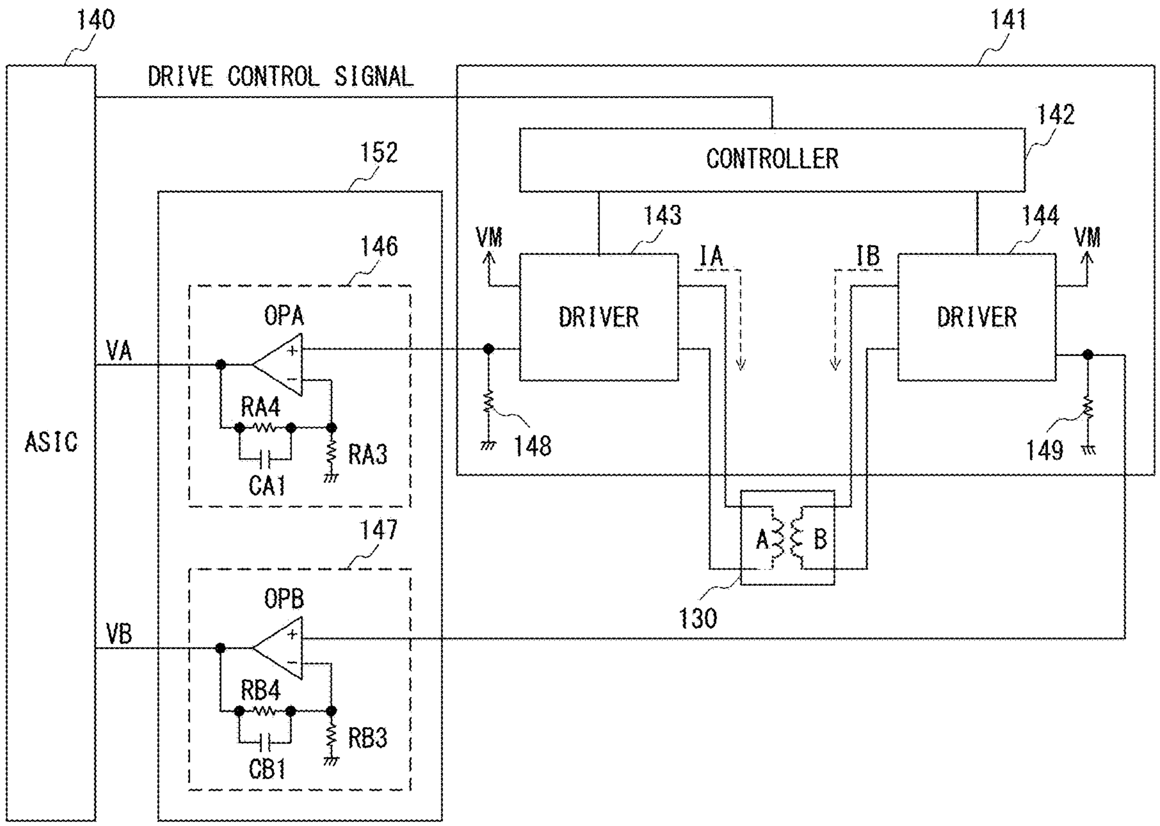
FIG. 4 is a specific circuit configuration diagram of a drive controller and a current detector.

FIG. 4 is a specific circuit configuration diagram of the drive controller 141 and the current detector 152. The stepping motor 130 in this embodiment is a two-phase stepping motor having two pairs of windings of an A-phase and a B-phase. The stepping motor 130 may be a motor of a plurality of phases having a plurality of windings.

The drive controller 141 includes drivers 143 and 144 that perform current control for the A-phase and the B-phase, respectively, a controller 142, and shunt resistors 148 and 149. The drivers 143 and 144 each include an H-bridge circuit to provide current to the windings of the motor 130. The controller 142 controls the drivers 143 and 144 in accordance with the drive control signal acquired from the ASIC 140. The driver 143 performs the current control for the A-phase of the stepping motor 130. The driver 144 performs the current control for the B-phase of the stepping motor 130. The shunt resistor 148 is used for detecting a current value of a driving current flowing through the A-phase of the stepping motor 130. The shunt resistor 149 is used for detecting a current value of a driving current flowing through the B-phase of the stepping motor 130.

The current detector 152 includes an A-phase current detector 146 and a B-phase current detector 147. The A-phase current detector 146 amplifies and smoothes the voltage generated by the shunt resistor 148. The B-phase current detector 147 amplifies and smoothes the voltage generated by the shunt resistor 149. The A-phase current detector 146 transmits a voltage VA generated by amplifying and smoothing the voltage of the shunt resistor 148 to the ASIC 140 as a detection signal. The B-phase current detector 147 transmits a voltage VB generated by amplifying and smoothing the voltage of the shunt resistor 149 to the ASIC 140 as a detection signal.

The A-phase current detector 146 is a non-inverting amplifier circuit including a low-pass filter (hereinafter referred to as "LPF") that uses an operational amplifier OPA. A cutoff frequency fA of the LPF is determined based on a resistance value of a resistor RA4 and a capacitance value of a capacitor CAL The A-phase current detector 146 converts a driving current IA flowing through the A-phase into the voltage VA with the following conversion formula, amplifies the voltage VA, and smoothes the amplified voltage VA with the cutoff frequency fA. The "RSA" is a resistance value of the shunt resistor 148. The "RA3" is a resistance value of a resistor RA3. The "RA4" is a resistance value of the resistor RA4. The "CA1" is a capacitance value of the capacitor CA1.

$$VA=(IA\times RSA)\times(1+RA4/RA3)$$

$$fA=1/(2\pi\times RA4\times CA1)$$

The driving current IA given at the time of driving of the stepping motor 130 includes a high-frequency component. Thus, it is preferred that the resistance value of the resistor RA4 and the capacitance value of the capacitor CA1 each be such a constant that the high-frequency component is filtered so that the driving current IA can be sufficiently smoothed. Specifically, the resistance value of the resistor RA4 and the capacitance value of the capacitor CA1 are set such that the cutoff frequency fA becomes a frequency that is higher than a driving frequency of the stepping motor 130 by 10 to 20 times.

Similarly, the B-phase current detector 147 is a non-inverting amplifier circuit including an LPF that uses an operational amplifier OPB. A cutoff frequency fB of the LPF is determined based on a resistance value of a resistor RB4 and a capacitance value of a capacitor CB1. The B-phase current detector 147 converts a driving current IB flowing through the B-phase into the voltage VB with the following conversion formula, amplifies the voltage VB, and smoothes the amplified voltage VB with the cutoff frequency fB. The "RSB" is a resistance value of the shunt resistor 149. The "RB3" is a resistance value of a resistor RB3. The "RB4" is a resistance value of the resistor RB4. The "CB1" is a capacitance value of the capacitor CB1.

$$VB=(IB\times RSB)\times(1+RB4/RB3)$$

$$fB=1/(2\pi\times RB4\times CB1)$$

The resistance value of the resistor RB4 and the capacitance value of the capacitor CB1 are set such that the cutoff frequency fB becomes higher than the cutoff frequency fA (fB>fA). Specifically, the resistance value of the resistor RB4 and the capacitance value of the capacitor CB1 are set such that the cutoff frequency fB becomes a frequency that is about ⅓ times to about ⅒ times the driving frequency of the stepping motor 130. Setting such values enables filtering of a sudden change in the driving current.

Figure 5:
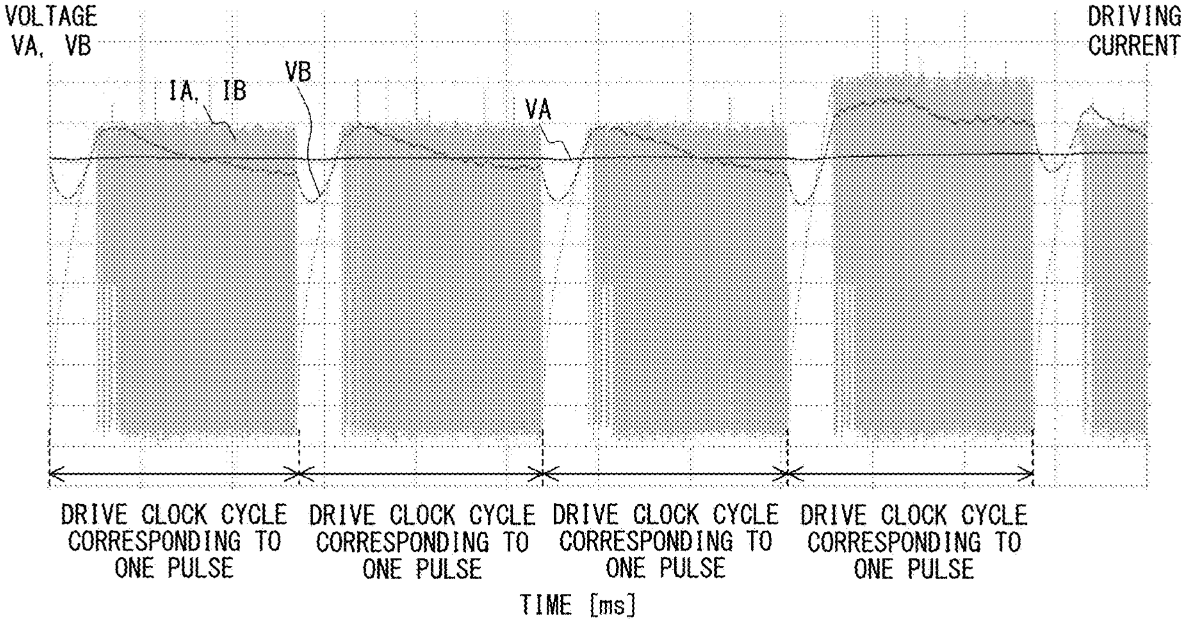
FIG. 5 is an illustrative view of voltage values of voltages VA and VB.

FIG. 5 is an illustrative view of voltage values of the detection signals (voltages VA and VB) given at the time of driving of the stepping motor 130. Here, illustration is made of voltage values of the voltages VA and VB given in a case where the driving currents IA and IB by drive clocks corresponding to four pulses are smoothed and amplified with the cutoff frequencies fA and fB which are 10 times and ¼ times the driving frequency, respectively.

The driving currents IA and IB detected by the current detector 152 change at a high frequency within a drive clock cycle corresponding to one pulse. Thus, in a case where the driving currents IA and IB are subjected to voltage conversion without smoothing, completely different current values are detected depending on sampling points. Consequently, accurate voltage conversion is difficult.

However, as illustrated in FIG. 5, the voltage VA is converted to a constant voltage value at any timing of sampling because the high-frequency component of the driving current IA is smoothed with the cutoff frequency fA. Further, with regard to the voltage VB, smoothing of the driving current IB is performed with a higher cutoff frequency fB with respect to the voltage VA. Thus, the high-frequency component of the driving current IB within the drive clock cycle corresponding to one pulse is roughly smoothed but has more followability with respect to a change in the driving current IB than in the case of the voltage VA.

For example, the current value of the driving current in each drive clock cycle of the drive clocks corresponding to four pulses in FIG. 5 is detected as substantially the same current value when the voltage VA is sampled. However, when the voltage VB is sampled, it is easily distinguished that the current value of the fourth pulse is larger than those of the first pulse, the second pulse, and the third pulse.

Figure 6:
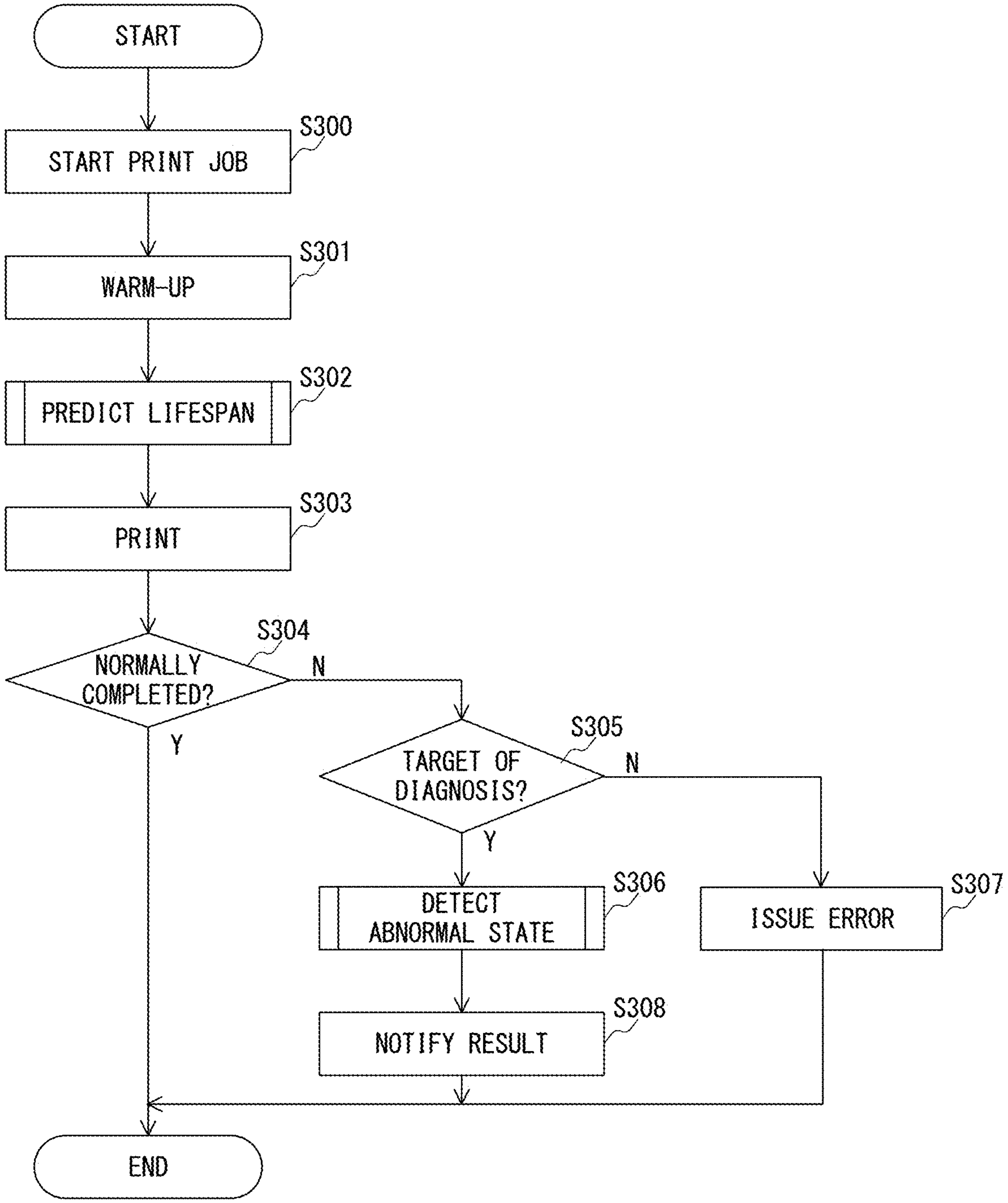
FIG. 6 is a flowchart for illustrating lifespan prediction processing and abnormality detection processing.

FIG. 6 is a flowchart for illustrating lifespan prediction processing and abnormality detection processing for each driving component of the driving device 300 having the configuration as described above. This processing is executed in a case where a user inputs an execution instruction for a print job via the operation portion 400.

The image forming apparatus 10 starts a print job in accordance with an execution instruction for a print job (Step S300). The image forming apparatus 10 first performs warm-up processing for each component (Step S301). In the warm-up processing, the driving device 300 performs, for example, driving of a motor, control operation for a sensor, and adjustment operation for various components. During the warm-up processing, the image forming apparatus 10 instructs the driving device 300 to perform the lifespan prediction processing for the stepping motor 130 and the driving components (Step S302). Details of the lifespan prediction processing for the stepping motor 130 and the driving components are described later.

After the warm-up processing has been terminated, the image forming apparatus 10 prints an image on a sheet in accordance with the print job (Step S303). In a case where operation has been normally completed without occurrence of, for example, jamming, an error, or an alarm due to the warm-up processing or the printing processing (Step S304: Y), the image forming apparatus 10 terminates the operation by the print job.

In a case where operation has been abnormally terminated with occurrence of, for example, jamming, an error, or an alarm due to the warm-up processing or the printing operation (Step S304: N), the image forming apparatus 10 determines whether or not the abnormality is a target of diagnosis of an abnormal part (Step S305). In a case where the abnormality is not a target of diagnosis of an abnormal part (Step S305: N), the image forming apparatus 10 issues an error in accordance with content of abnormality and terminates the processing (Step S307). The image forming apparatus 10 issues an error, for example, by notifying an error via the operation portion 400. In a case where the image forming apparatus 10 is communicable with an external device via a network, the image forming apparatus 10 may notify content of abnormality to the external device.

In a case where the abnormality is a target of diagnosis of an abnormal part (Step S305: Y), the image forming apparatus 10 instructs the driving device 300 to perform the abnormality detection processing for the stepping motor 130 and the driving components (Step S306). Details of detection processing for an abnormal state are described later. In a case where the detection processing for an abnormal state has been terminated, the image forming apparatus 10 notifies a detection result of an abnormal state and terminates the processing (Step S308). The image forming apparatus 10 notifies the detection result, for example, via the operation portion 400. In a case where the image forming apparatus 10 is communicable with an external device via a network, the image forming apparatus 10 may notify the detection result to the external device.

<Lifespan Prediction>

Description is made of the lifespan prediction processing for the stepping motor 130 and the driving components in Step S302. Here, the lifespan prediction processing for the stepping motor 130 is described.

Figure 7:
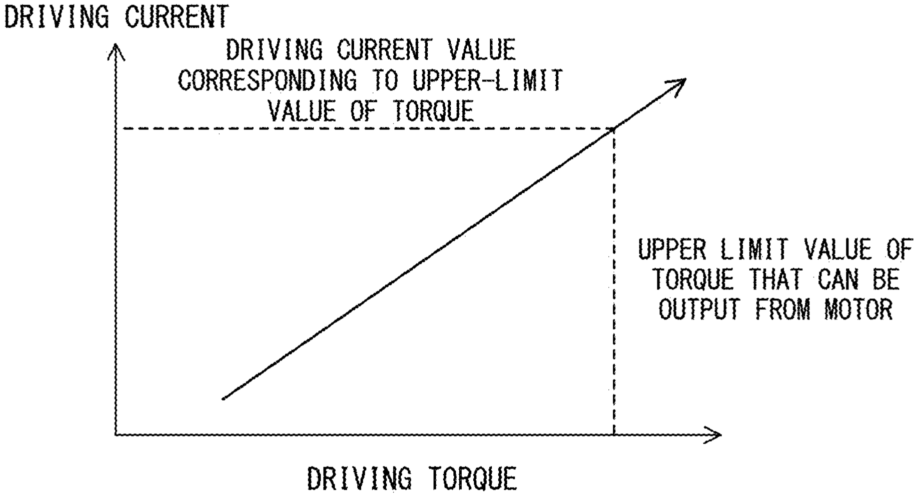
FIG. 7 is an illustrative graph for showing a relationship between a driving torque and a driving current of a stepping motor.

FIG. 7 is an illustrative graph for showing a relationship between a driving torque and a driving current of the stepping motor 130. In general, as an integrated value of the time of driving of the driving device 300 (drive integrated time) increases, a driving torque of the stepping motor 130 increases due to, for example, friction of the pulley 131 or the belt 133. In a case where the driving torque exceeds an upper limit value of the torque of the stepping motor 130 that can be output, the stepping motor 130 steps out, with the result that normal operation cannot be performed.

For example, a conversion table or a conversion formula indicating a relationship between the driving torque and the driving current shown in FIG. 7 is stored in advance in the memory 151. The CPU 150 that controls the stepping motor 130 can determine the driving torque from the driving current with use of the conversion table or the conversion formula. As described above, the driving current is calculated from a sampling value of the voltage VA. The ASIC 140 determines a driving current from the voltage VA having been suitably acquired. The CPU 150 can detect a present driving torque of the stepping motor 130 based on the driving current having been determined by the ASIC 140. The CPU 150 can detect the lifespan of the stepping motor 130 based on the detected driving torque. The lifespans of driving components can also be detected in a similar manner.

Figure 8:
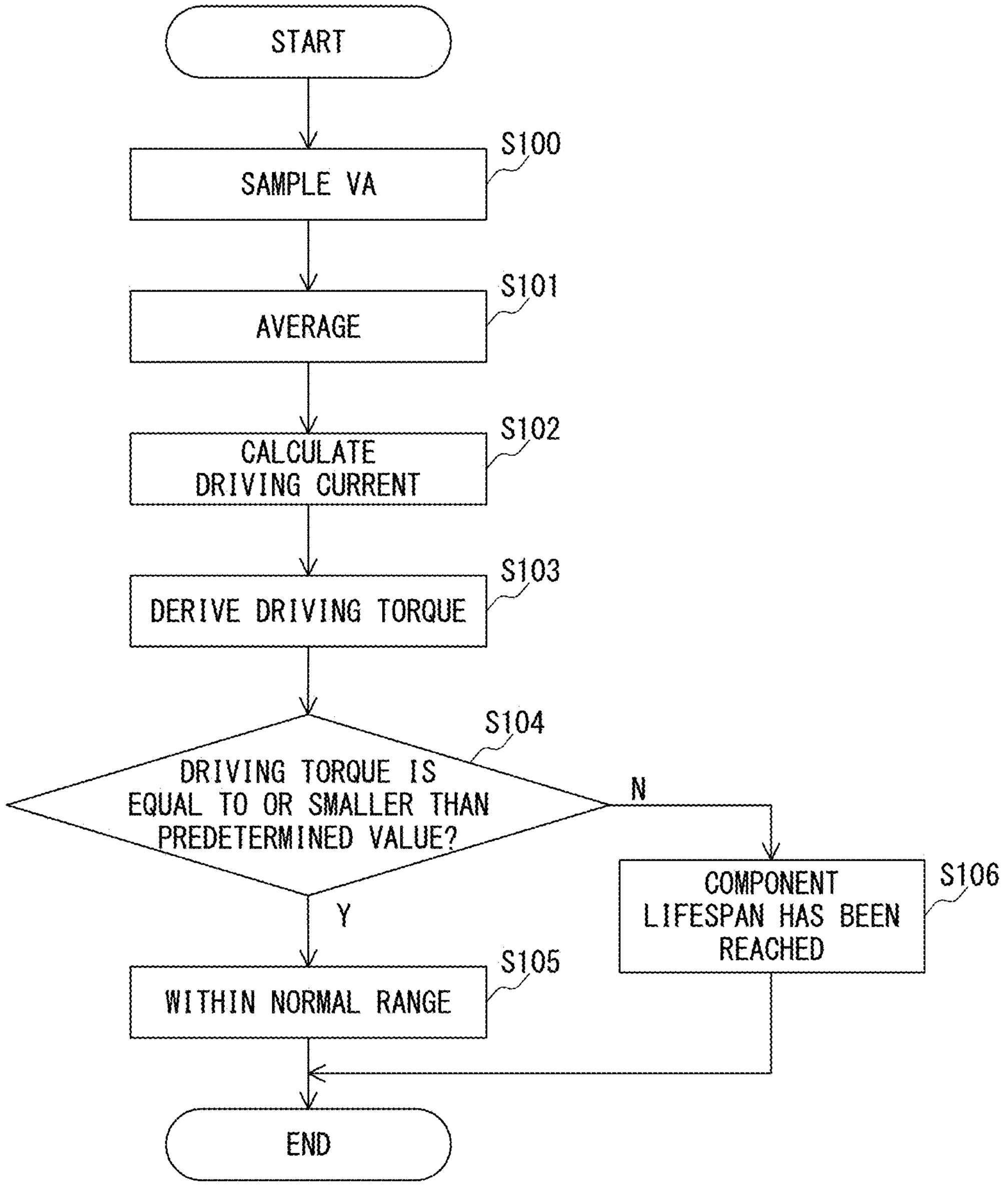
FIG. 8 is a flowchart for illustrating the lifespan prediction processing.

FIG. 8 is a flowchart for illustrating the lifespan prediction processing. Here, the lifespan prediction for the stepping motor 130 is performed. The lifespan prediction is performed with use of the voltage VA that is calculated with the A-phase current detector 146 which is less liable to be affected by high-frequency noises.

The ASIC 140 performs sampling of the voltage VA at a predetermined timing at which the stepping motor 130 performs a constant-speed motion, for example, at the time of starting a print job (Step S100). The ASIC 140 performs averaging processing for a plurality of acquired voltages VA to acquire a VA average value (Step S101). The ASIC 140 calculates the driving current IA (current detection data) of the stepping motor 130 from the VA average value with use of a conversion formula prepared in advance (Step S102). The CPU 150 determines the driving torque of the stepping motor 130 in accordance with the driving current IA calculated by the ASIC 140, with use of the conversion table or the conversion formula described with reference to FIG. 7 (Step S103).

The CPU 150 determines whether or not the determined driving torque is equal to or smaller than a predetermined value of the driving torque being a lifespan limit of the stepping motor 130 (Step S104). In a case where the determined driving torque is equal to or smaller than the predetermined value (Step S104: Y), the CPU 150 determines that the determined driving torque falls within a normal range (Step S105). In this case, the CPU 150 determines that the stepping motor 130 has not reached the component lifespan.

In a case where the determined driving torque is larger than the predetermined value (Step S104: N), the CPU 150 determines that the stepping motor 130 has reached the component lifespan (Step S106). The CPU 150 notifies, via the operation portion 400, replacement of a component because the stepping motor 130 has reached the component lifespan. As described above, the lifespan prediction for the stepping motor 130 or the driving components is performed with use of the voltage VA detected by the A-phase current detector 146.

<Detection of Abnormal State>

Description is made of the detection processing for an abnormal state in Step S306. Here, description is made of the detection processing for an abnormal state of the stepping motor 130.

Figure 9:
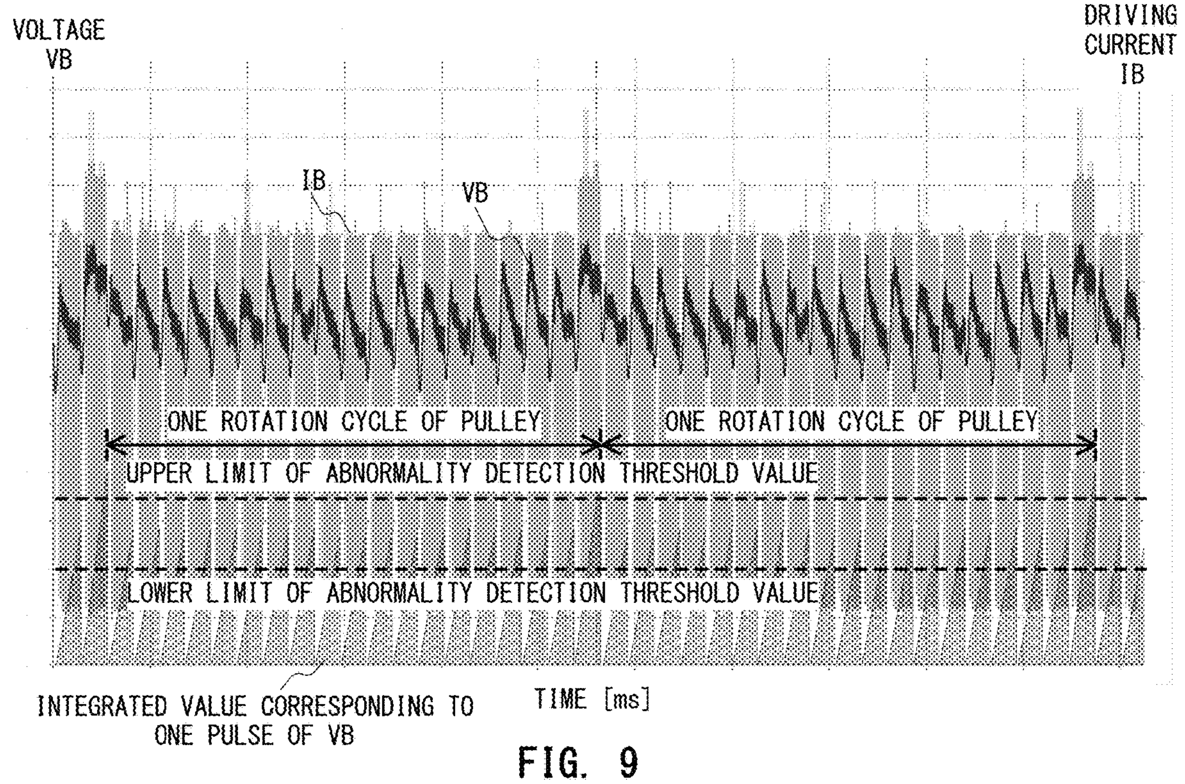
FIG. 9 is a waveform diagram of a driving current IB and the voltage VB given in a case where the driving torque becomes larger.

FIG. 9 is a waveform diagram of the driving current IB and the voltage VB given in a case where the driving torque of the stepping motor 130 instantly becomes larger. For example, abnormality occurs in meshing of the pulley 131 due to adhesion of a foreign matter or the like to any one of a plurality of driving components that transmit a driving force output from the stepping motor 130 to the conveyance roller 135. In this case, the driving torque of the stepping motor 130 instantly becomes larger at the timing of meshing of the pulley 131. As the driving torque instantly becomes larger, the driving current IB becomes larger. As the driving current IB becomes larger, the voltage VB generated by converting and smoothing the driving current IB also becomes larger.

In a case where a foreign matter adheres to a part of the driving components provided along the route of transmitting the driving force output from the stepping motor 130 to the conveyance roller 135, the driving torque instantly becomes larger only one time in one rotation cycle of the pulley 131 due to the influence of adhesion of the foreign matter. In a case where such a change cycle of the driving torque is detected, and the change cycle matches one rotation cycle of the pulley 131, it is determined that there is some abnormality in the pulley 131.

The change cycle of the driving torque is calculated by integrating the voltage VB in one pulse period of the drive clock of the stepping motor 130, for example, as illustrated in FIG. 9. The cycle of occurrence timing of the drive clock in which the integrated value of the voltage VB is outside a predetermined range set in advance becomes a change cycle of the driving torque. Determination of whether or not the change cycle of the driving torque matches one rotation cycle of the pulley 131 can be made by referring to a cycle table that is unique to a driving component prepared in advance.

Figure 10:
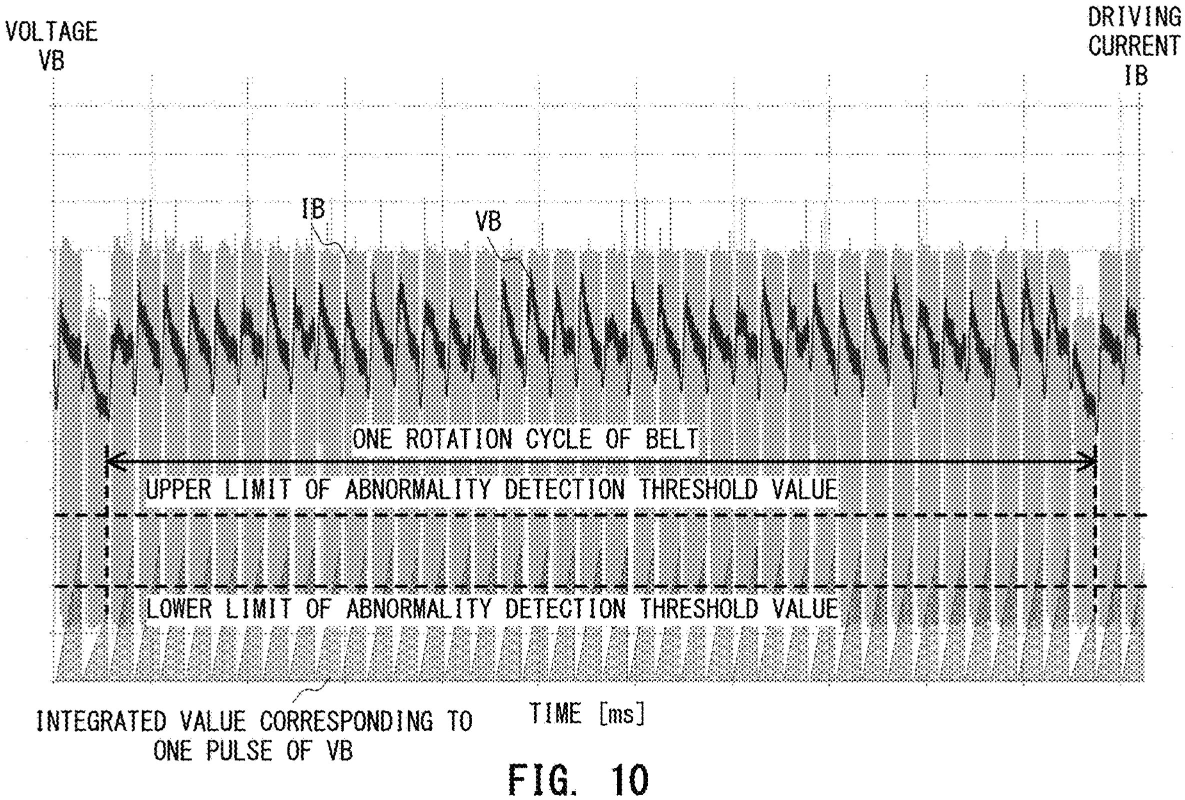
FIG. 10 is a waveform diagram of the driving current IB and the voltage VB given in a case where the driving torque becomes smaller.

FIG. 10 is a waveform diagram of the driving current IB and the voltage VB given in a case where the driving torque of the stepping motor 130 instantly becomes smaller. For example, in a case where any one of the plurality of driving components that transmit the driving force output from the stepping motor 130 to the conveyance roller 135 is broken, the driving torque of the stepping motor 130 becomes smaller due to idling at the time of meshing of the component. As the driving torque becomes smaller, the driving current IB becomes smaller. As the driving current IB becomes smaller, the voltage VB generated by converting and smoothing the driving current IB also becomes smaller. In a case where the breakage of the driving component occurs at one part, the driving torque instantly becomes smaller only one time in one rotation cycle of the belt 133.

In a case where the change cycle of the driving torque is detected in the manner similar to that described above, and the change cycle matches one rotation cycle of the belt 133, it is determined that there is some abnormality in the belt 133. Determination of whether or not the change cycle matches one rotation cycle of the belt 133 can be made by referring to a cycle table that is unique to a component prepared in advance.

In a case where the driving torque of the stepping motor 130 instantly changes, the driving current IA does not change. This is because the cutoff frequency fA of the A-phase current detector 146 is set to a frequency lower than the cutoff frequency fB of the B-phase current detector 147. In the A-phase current detector 146, the instant change in the driving current IA and the voltage VA is smoothed. Thus, the voltage VA detected by the A-phase current detector 146 is not used for the abnormality determination for the driving components. In a case where a relationship between the cutoff frequency fA of the A-phase current detector 146 and the cutoff frequency fB of the B-phase current detector 147 is opposite (fB<fA), the voltage VA detected by the A-phase current detector 146 is used for the abnormality determination for the driving components. In this case, the voltage VB detected by the B-phase current detector 147 is used for the lifespan prediction.

Further, there is a case in which breakage such as disconnection of a winding or a resistance value abnormality occurs in the stepping motor 130 itself. In this case, the driving current given at the time of driving of the stepping motor 130 always becomes an abnormal value that is always, rather than instantly, larger than or smaller than a normal value. The driving currents IA and IB of the A-phase and the B-phase of the stepping motor 130 can be calculated with the voltages VA and VB, respectively. In a case where at least one of the current values of the driving currents IA and IB is outside the predetermined range, and the current value outside the predetermined range is continuously detected, it can be determined that abnormality has occurred in the stepping motor 130.

Figure 11:
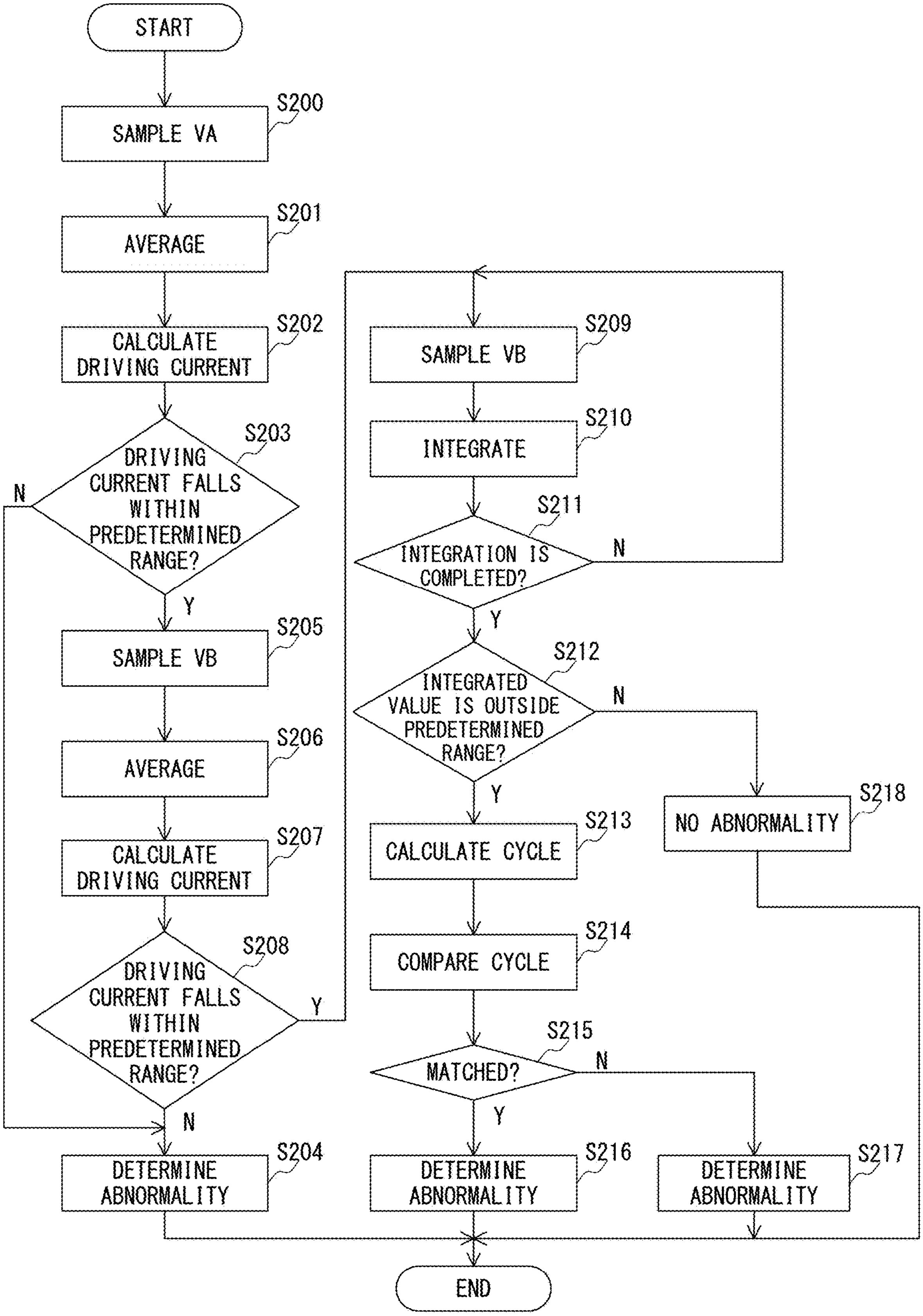
FIG. 11 is a flowchart for illustrating the abnormality detection processing.

FIG. 11 is a flowchart for illustrating the abnormality detection processing for the driving components.

The CPU 150 drives the stepping motor 130 of the driving device 300. The ASIC 140 performs sampling of the voltage VA at a predetermined timing at which the stepping motor 130 performs a constant-speed motion (Step S200). The ASIC 140 performs averaging processing for a plurality of acquired voltages VA to acquire a VA average value (Step S201). The ASIC 140 calculates the driving current IA of the stepping motor 130 from the VA average value with use of a conversion formula prepared in advance (Step S202).

The CPU 150 determines whether or not the driving current IA calculated by the ASIC 140 falls within the predetermined range (Step S203). In a case where the driving current IA is outside the predetermined range (Step S203: N), the CPU 150 determines that winding abnormality occurs in the A-phase of the stepping motor 130 (Step S204). The CPU 150 gives, via the operation portion 400, the notification that replacement of a component is required due to occurrence of winding abnormality in the A-phase of the stepping motor 130.

In a case where the driving current IA falls within the predetermined range (Step S203: Y), the ASIC 140 performs sampling of the voltage VB at a predetermined timing at which the stepping motor 130 performs a constant-speed motion (Step S205). The ASIC 140 performs averaging processing for a plurality of acquired voltages VB to acquire a VB average value (Step S206). The ASIC 140 calculates the driving current IB of the stepping motor 130 from the VB average value with use of a conversion formula prepared in advance (Step S207).

The CPU 150 determines whether or not the driving current IB calculated by the ASIC 140 falls within the predetermined range (Step S208). The predetermined range in this case may be the same as the predetermined range for the processing step of Step S203. In a case where the driving current IB is outside the predetermined range (Step S208: N), the CPU 150 determines that winding abnormality occurs in the B-phase of the stepping motor 130 (Step S204). The CPU 150 gives, via the operation portion 400, the notification that replacement of a component is required due to occurrence of winding abnormality in the B-phase of the stepping motor 130. In the manner described above, determination is made of the presence or absence of abnormality in the stepping motor 130 itself.

In a case where the driving current IB falls within the predetermined range (Step S208: Y), the CPU 150 performs determination on the presence or absence of abnormality in driving components other than the stepping motor 130. First, the CPU 150 uses the ASIC 140 to perform sampling of the voltage VB in a sampling cycle which is sufficiently faster than a cycle of the drive clock during the constant-speed motion of the stepping motor 130 (Step S209). The CPU 150 integrates the acquired voltage VB within one pulse period of the drive clock (Step S210). The CPU 150 and the ASIC 140 repeatedly perform sampling of the voltage VB and integration of the voltage VB until the processing is completed for a predetermined number of clocks (Step S211: N). The predetermined number of clocks is the number of clocks with which the driving components such as the pulley 131 and the belt 133 driven by the stepping motor 130 can be rotated by at least a predetermined number of times or more.

In a case where calculation of integrated values corresponding to the predetermined number of clocks is terminated (Step S211: Y), the CPU 150 determines whether or not the calculated integrated values corresponding to the predetermined number of clocks are each outside a predetermined range (Step S212). The predetermined range in this case is different from the predetermined ranges for the processing steps of Step S203 and Step S208. In a case where all of the integrated values fall within the predetermined range (Step S212: N), the CPU 150 determines that there is no abnormality in all of the stepping motor 130 and the plurality of driving components that transmit the driving force output from the stepping motor 130 to the conveyance roller 135 (Step S218).

In a case where at least one integrated value is outside the predetermined range (Step S212: Y), the CPU 150 calculates a generation cycle of the clock in which the integrated value has been calculated (Step S213). The CPU 150 compares the calculated generation cycle of the clock with a rotation cycle table for each driving component prepared in advance (Step S214).

In a case where there is a rotation cycle that matches the generation cycle of the clock (Step S215: Y), the CPU 150 determines that abnormality occurs in the driving component with a matching rotation cycle (Step S216). The CPU 150 notifies, via the operation portion 400, that replacement of the driving component for which it is determined that abnormality has occurred is required.

In a case where there is no rotation cycle matching the generation cycle of the clock (Step S215: N), the CPU 150 determines that abnormality occurs in any one of the stepping motor 130 or the driving components, or in two or more driving components (Step S217). The CPU 150 notifies, via the operation portion 400, that replacement of any one of the stepping motor 130 or the driving components, or two or more driving components in which abnormality has occurred is required.

In the manner described above, the driving device 300 can perform lifespan prediction and determination of the presence or absence of occurrence of abnormality for the drive source and the driving components in the driving device 300 with use of the current detector 152, the ASIC 140, and the CPU 150. The driving device 300 can detect the lifespan of the driving components and the stepping motor 130 with a minimum configuration. Further, the driving device 300 can specify a component in which abnormality has occurred at the time of occurrence of the abnormality. In the manner described above, according to the present disclosure, the lifespan prediction and specification of an abnormal part for the motor and the driving components can be accurately performed.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-178107, filed Nov. 7, 2022, which is hereby incorporated by reference herein in its entirety.

What is claimed is:

1. A driving device comprising:

a drive source including a plurality of windings;

a plurality of driving components configured to transmit a driving force output from the drive source to a load;

a current detector configured to detect a driving current flowing through the plurality of windings; and at least one processor configured to determine a lifespan and presence or absence of abnormality of the drive source and the plurality of driving components based on the driving current, wherein the current detector is configured to detect a first driving current flowing through a first winding with a first low-pass filter having a first cutoff frequency, and detect a second driving current flowing through a second winding with a second low-pass filter having a second cutoff frequency which is higher than the first cutoff frequency, wherein the at least one processor is configured to determine the lifespan of the drive source based on the first driving current, and wherein the at least one processor is configured to determine the presence or absence of abnormality of the drive source based on the first driving current and the second driving current, and determine the presence or absence of abnormality of the plurality of driving components based on the second driving current.

2. The driving device according to claim 1, wherein the at least one processor is configured to determine a driving torque from the first driving current and determine the lifespan of the drive source based on the driving torque.

3. The driving device according to claim 2, wherein the at least one processor is configured to determine that the drive source has reached the lifespan in a case where the determined driving torque is larger than a predetermined value of a driving torque being a lifespan limit of the drive source.

4. The driving device according to claim 1, wherein the at least one processor is configured to determine that the drive source is abnormal in a case where at least one of the first driving current or the second driving current is outside a predetermined range.

5. The driving device according to claim 1, wherein the at least one processor is configured to sample and integrate the second driving current only for a predetermined period and determine that the drive source and the plurality of driving components have no abnormality in a case where an integrated value falls within a predetermined range.

6. The driving device according to claim 5, wherein the at least one processor is configured to determine a driving component with occurrence of abnormality based on a generation cycle of a period in which the integrated value outside the predetermined range is calculated.

7. The driving device according to claim 6, wherein the at least one processor is configured to determine a driving component having a rotation cycle matching the generation cycle as a driving component with occurrence of abnormality.

8. The driving device according to claim 6, wherein the at least one processor is configured to determine that abnormality has occurred in any of the drive source or at least one of the plurality of driving components in a case where a driving component having a rotation cycle matching the generation cycle is absent.

9. The driving device according to claim 1, wherein the drive source is a stepping motor.

10. The driving device according to claim 9, wherein the first cutoff frequency is a frequency that is higher than a driving frequency of the stepping motor by 10 to 20 times, and wherein the second cutoff frequency is a frequency that is ⅓ to 1/10 times the driving frequency of the stepping motor.

11. An image forming apparatus comprising:

an image forming unit configured to form an image on a sheet;

a load to be used for forming the image; and a driver configured to drive the load, wherein the driver includes:

a drive source including a plurality of windings;

a plurality of driving components configured to transmit a driving force output from the drive source to the load;

a current detector configured to detect a driving current flowing through the plurality of windings; and at least one processor configured to determine a lifespan and presence or absence of abnormality of the drive source and the plurality of driving components based on the driving current, wherein the current detector is configured to detect a first driving current flowing through a first winding with a first low-pass filter having a first cutoff frequency, and detect a second driving current flowing through a second winding with a second low-pass filter having a second cutoff frequency which is higher than the first cutoff frequency, wherein the at least one processor is configured to determine the lifespan of the drive source based on the first driving current, and wherein the at least one processor is configured to determine the presence or absence of abnormality of the drive source based on the first driving current and the second driving current, and determine the presence or absence of abnormality of the plurality of driving components based on the second driving current.

* * * * *